US012565326B2

(12) United States Patent
Przybyla et al.

(10) Patent No.: US 12,565,326 B2
(45) Date of Patent: Mar. 3, 2026

(54) AIR INTAKE LIP OF AN AIRCRAFT ENGINE NACELLE PROVIDED WITH A PASSIVE SHUT-OFF DEVICE FOR AN EXHAUST DEVICE

(71) Applicant: Airbus Operations SAS, Toulouse (FR)

(72) Inventors: Benoit Przybyla, Toulouse (FR); Szymon Fulara, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 19/085,662

(22) Filed: Mar. 20, 2025

(65) Prior Publication Data

US 2025/0296693 A1 Sep. 25, 2025

(30) Foreign Application Priority Data

Mar. 22, 2024 (FR) ...................................... 2402877

(51) Int. Cl.
B64D 33/02 (2006.01)

(52) U.S. Cl.
CPC ...... B64D 33/02 (2013.01); *B64D 2033/0233* (2013.01)

(58) Field of Classification Search
CPC ............ B64D 33/02; B64D 2033/0233; B64D 2033/0226; B64D 2033/0206; F02C 7/04; F02C 7/047; F02C 7/045; F01D 25/02
See application file for complete search history.

(56) References Cited

U.S. PATENT DOCUMENTS

| | | | |
|---|---|---|---|
| 6,443,395 B1 | 9/2002 | Porte et al. | |
| 7,739,865 B2 * | 6/2010 | Prasad .................... | F02C 7/042 |
| | | | 60/226.3 |
| 9,228,534 B2 * | 1/2016 | Jain ........................ | B64D 33/02 |
| 11,085,372 B2 * | 8/2021 | Mackin .................. | F01D 25/02 |
| 2016/0017751 A1 | 1/2016 | Caruel | |
| 2019/0195128 A1 * | 6/2019 | Diaz ........................ | F02C 7/04 |
| 2020/0025072 A1 | 1/2020 | Mackin et al. | |
| 2020/0130815 A1 | 4/2020 | Custance et al. | |
| 2024/0051668 A1 | 2/2024 | Vidaic | |

FOREIGN PATENT DOCUMENTS

| | | |
|---|---|---|
| CN | 114560090 B | 8/2023 |
| EP | 1186533 A1 | 3/2002 |
| EP | 3597540 A1 | 1/2020 |
| WO | 2022136318 A1 | 6/2022 |

OTHER PUBLICATIONS

French Search Report and Written Opinion for corresponding French Patent Application No. 2402877 dated Oct. 2, 2024.

* cited by examiner

*Primary Examiner* — Arfan Y. Sinaki
(74) *Attorney, Agent, or Firm* — Greer, Burns & Crain, Ltd.

(57) ABSTRACT

An air intake lip of an aircraft engine nacelle provided with a passive shut-off device for exhaust devices. The passive shut-off device is capable of adopting a shut-off position in which it shuts off the exhaust devices and an open position in which it clears the exhaust devices as a function of the temperature perceived by the passive shut-off device.

12 Claims, 4 Drawing Sheets

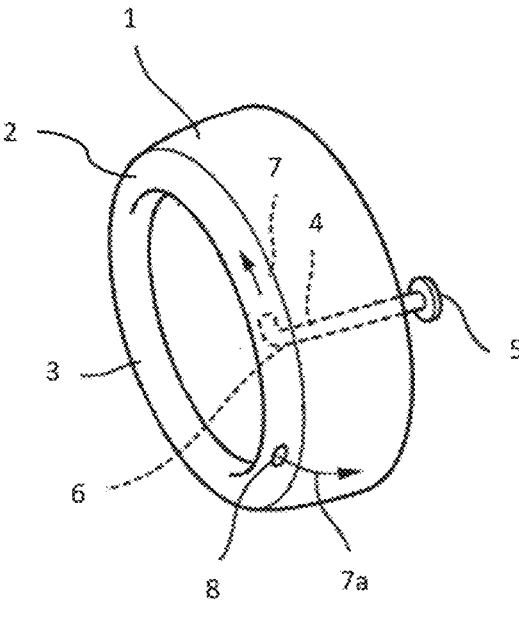
Fig. 1
(prior art)
Fig. 2
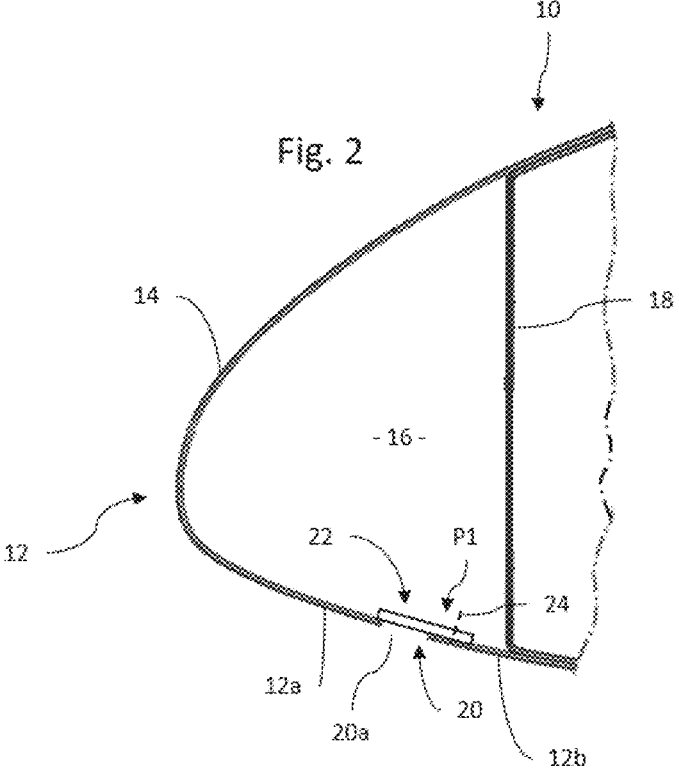

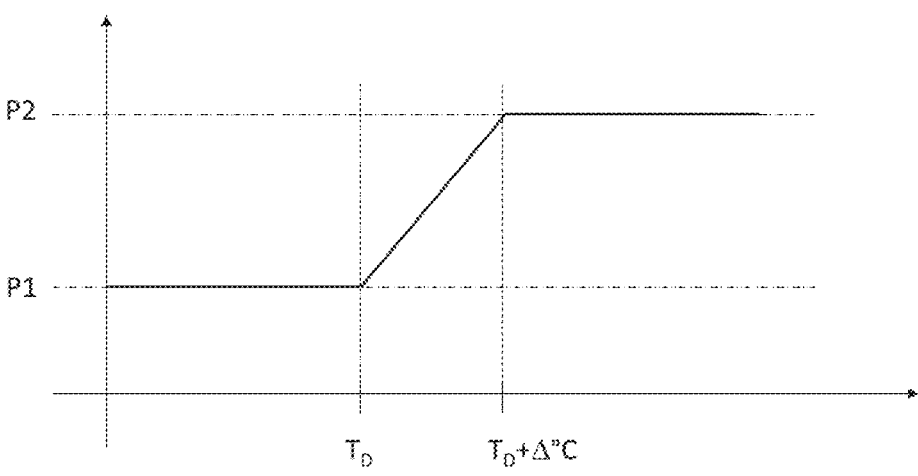
Fig. 5
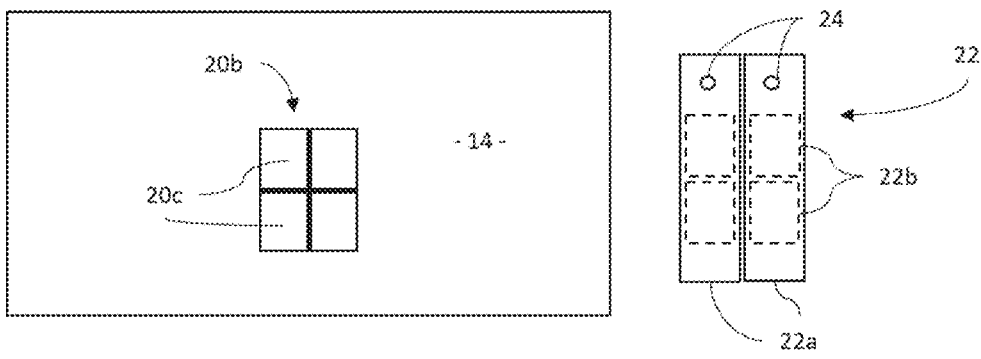
Fig. 6
Fig. 7

AIR INTAKE LIP OF AN AIRCRAFT ENGINE NACELLE PROVIDED WITH A PASSIVE SHUT-OFF DEVICE FOR AN EXHAUST DEVICE

CROSS-REFERENCES TO RELATED APPLICATIONS

This application claims the benefit of French Patent Application Number FR2402877 filed on Mar. 22, 2024, the entire disclosure of which is incorporated herein by way of reference.

FIELD OF THE INVENTION

The present invention relates to an air intake lip of an aircraft engine nacelle provided with a passive shut-off device for an exhaust device.

BACKGROUND OF THE INVENTION

When necessary (to prevent the formation of ice or remove ice that has already formed), the leading edge of the air intake lip of aircraft engines is de-iced by heating using pressurized hot air, taken from said engine and conveyed to said leading edge by a pressurized hot air circulation circuit. An example of such a de-icing device is disclosed in patent EP1186533.

To this end, such an air intake lip comprises, in a known manner, a hollow leading edge defining an inner annular peripheral chamber, closed by an inner partition (or frame) and provided with at least one orifice placing said inner chamber in communication with the outside. In addition, a hot air supply pipe is connected, on the rear side opposite said leading edge, to a pressurized hot air circulation circuit and, on the front side towards the leading edge, to an injector injecting a flow of said pressurized hot air into the annular chamber.

Said hot air flow thus circulates in said annular chamber, heating it, before escaping to the outside through said communication orifice. Several orifices are provided in said leading edge for venting the hot air that has circulated inside the leading edge.

As shown schematically in FIG. 1, an aircraft engine nacelle 1 comprises an air intake lip 2. The lip 2 comprises a hollow leading edge 3 in which the hot air taken from the engine circulates.

The nacelle 1 also comprises an inner pipe 4 provided at its rear end, facing towards the body of the engine (not shown), with a connecting element 5, and at its front end, housed in the hollow leading edge 3 of the air intake 2, with an injector 6. Pressurized hot air is taken from the engine and is injected, by means of the inner pipe 4 and the injector 6, into the hollow leading edge 3 of the air intake lip 2.

The injector 6 injects a flow of hot air 7 that it receives from the pipe 4 into the inner duct of the lip 2. The hot air 7 circulates inside the leading edge 3 and heats it, which makes it possible to de-ice said leading edge.

A hot air exhaust device is used to discharge the hot air for de-icing out of the leading edge 3 and to avoid exceeding the thermal capability of the materials forming said edge 3. This device takes the form of orifices 8 distributed in the leading edge 3 of the lip 2 in order to vent (arrow 7a) the hot air that has circulated inside said leading edge 3. The orifices 8 can be calibrated in order to allow the discharge to the outside of just part of the hot air flow circulating in the hollow leading edge 3, the other part of said flow being caused to recirculate in said leading edge 3.

These orifices 8, due to their size and position and to the pressure difference between the inside and the outside of the lip 2, are detrimental to the performance of the aircraft, in particular during the take-off, climb, descent and landing phases, as they cause parasitic drag. In addition, these orifices generate aerodynamic disturbance resulting in additional, unpleasant acoustic effects during the aforementioned flight phases.

It is not generally necessary to de-ice the air intake lip during these flight phases.

There is therefore a need for a hot air exhaust device for discharging the hot air for de-icing the leading edge circulating in the air intake lip that has less impact on the performance of the aircraft and has a reduced acoustic footprint.

The present invention aims to overcome all or some of the drawbacks of the prior art.

SUMMARY OF THE INVENTION

To this end, the invention relates to an air intake lip of an aircraft engine nacelle provided with a hollow leading edge defining an inner annular peripheral chamber closed by an inner partition in which pressurized hot air circulates, said hollow leading edge being provided with at least one hot air exhaust device to allow the discharge to the outside of all or part of the hot air flow circulating in said annular chamber and at least one passive shut-off device for said at least one exhaust device, said at least one passive shut-off device being notable in that it is movable between a shut-off position in which said at least one passive shut-off device shuts off said at least one exhaust device and an open position in which said at least one passive shut-off device clears said at least one exhaust device, said at least one passive shut-off device being made from a shape memory material.

The present invention thus makes it possible to shut off the exhaust devices during the flight phases in which the de-icing of the air intake lip is inactive and to permit the discharge of pressurized hot air only during the flight phases requiring the de-icing of the air intake lip. As a result, the parasitic drag and acoustic footprint are greatly reduced.

According to particular embodiments, the device comprises other notable features taken individually or in combination:

In one particularly simple embodiment, said at least one passive shut-off device takes the shape of a part that complements the shape of the at least one exhaust device.

Said at least one passive shut-off device is capable of deforming from a predetermined transition temperature $T_D$.

Said at least one passive shut-off device is capable of occupying the shut-off position as soon as the temperature in the inner annular peripheral chamber is less than the predetermined transition temperature $T_D$.

Said at least one passive shut-off device is capable of occupying the open position as soon as the temperature in the inner annular peripheral chamber is greater than the predetermined transition temperature $T_D+\Delta°$ C.

Said at least one exhaust device takes the form of an exhaust orifice capable of discharging the pressurized hot air from the inner annular peripheral chamber.

Said at least one exhaust device takes the form of an exhaust grille comprising a plurality of exhaust orifices capable of discharging the pressurized hot air from the inner annular peripheral chamber.

It will be noted that, in the context of the present invention, said at least one passive shut-off device can take the form of a strip arranged facing each exhaust orifice.

Said at least one passive shut-off device comprises as many strips as there are exhaust orifices.

Said at least one passive shut-off device takes the form of a single plate the dimensions of which are suitable for covering all of the exhaust orifices of the exhaust grille.

Preferably, said at least one passive shut-off device comprises at least one protrusion suitable for shutting off said at least one exhaust device. The passive shut-off device thus effectively shuts off the exhaust device and prevents any leaking of air resulting in an external flow disturbance when the passive shut-off device is in the shut-off position.

The invention also relates to an aircraft comprising an air intake according to one of the preceding features.

BRIEF DESCRIPTION OF THE DRAWINGS

Further features and advantages of the device according to the invention will become more clearly apparent from reading the following description, given by way of non-limiting illustration, with reference to the appended drawings, in which:

FIG. 1 shows an air intake of an aircraft engine nacelle according to the prior art.

FIG. 2 shows a cross-sectional view of an air intake of an aircraft engine nacelle comprising a passive shut-off device according to the invention, the passive shut-off device being in the shut-off position.

FIG. 5 shows a graph of the deformation of the passive shut-off device according to the invention.

FIG. 6 shows a top view of one particular embodiment of the shut-off device according to the invention, suitable for a different exhaust device from the one shown in the preceding figures.

FIG. 7 shows a first variant embodiment of the passive shut-off device according to the invention.

DETAILED DESCRIPTION OF THE PREFERRED EMBODIMENTS

Figure 3:
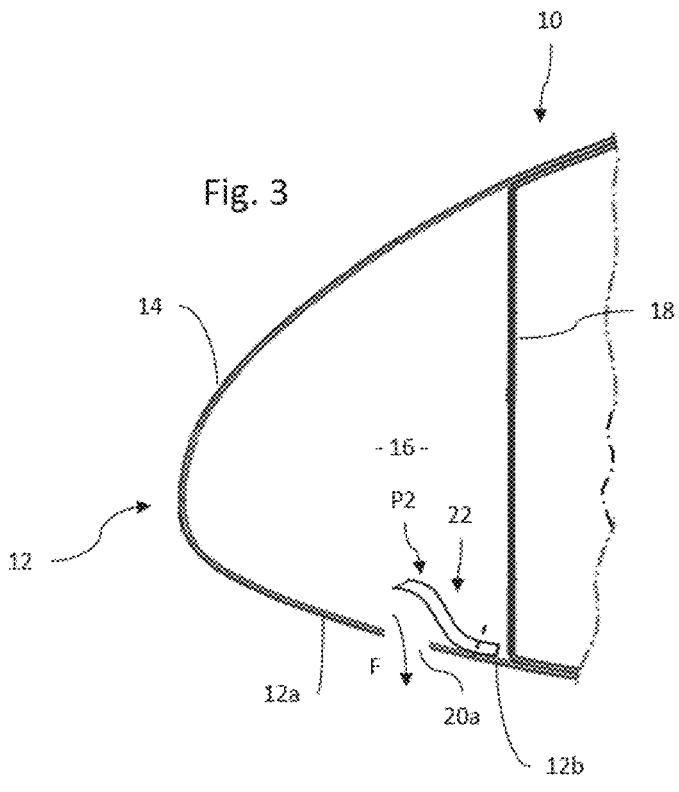
FIG. 3 shows a cross-sectional view of an air intake of an aircraft engine nacelle comprising a passive shut-off device according to the invention, the passive shut-off device being in the open position.

FIG. 2 shows a nacelle 10 of an aircraft engine provided with air intake lip 12. The air intake lip 12 comprises a hollow leading edge 14 defining an inner annular peripheral chamber 16 closed by an inner partition 18 in which pressurized hot air circulates. This pressurized hot air is taken from the aircraft engine and conveyed by any means known to a person skilled in the art into the inner annular peripheral chamber 16 of the air intake lip 12.

When the operating conditions of the aircraft so require, the hot air taken from the engine is used to de-ice the leading edge 14 of the air intake lip 12, and this hot air must be discharged in order to reduce the thermal stresses on the materials forming the leading edge 14.

To this end, the hollow leading edge 14 is provided with at least one exhaust device 20 in order to make it possible to discharge to the outside all or part of said hot air flow circulating in said annular chamber 16. The leading edge 14 can have a plurality of exhaust devices 20 distributed over the whole periphery of the leading edge 14 or distributed on a portion of said leading edge only. In the example shown in FIG. 2, a single exhaust device 20 is shown: it is made in the wall of the air intake lip 12, between a first portion 12a and a second portion 12b of the lip 12. In this example, the exhaust device 20 takes the form of an exhaust orifice 20a.

However, these exhaust devices 20 are not necessary throughout the whole flight. They are detrimental to the performance of the aircraft, in particular during the take-off, climb, descent and landing phases, and even generate unpleasant noise annoyance for people living near airports.

In order to prevent these annoyances, the hollow leading edge 14 is provided with at least one passive shut-off device 22 movable between a shut-off position P1 (shown in FIG. 2) in which the passive shut-off device 22 shuts off the exhaust device 20 and an open position P2 (shown in FIG. 3) in which the passive shut-off device 22 clears said exhaust device 20.

The passive shut-off device 22 is fastened to the hollow leading edge 14 by any known, appropriate fastening means 24. The fastening means 24 can be fastened to the first portion 12a or to the second portion 12b of the lip 12.

The passive shut-off device 22 is made from a shape memory material, that is, the device 22 can remember and return to its original shape after significant deformation as a result of a specific external stimulus such as temperature. The shape of the device 22 can therefore alternate between two previously memorized shapes when its temperature varies around a predetermined transition temperature $T_D$: a first so-called rest shape, which corresponds to the shut-off position P1, and a second so-called deformed shape, which corresponds to the open position P2. In other words, the device 22 changes shape depending on the temperature to which it is subjected. The material NiTi, an alloy of nickel and titanium, has such properties. Nitinol®, which has these properties, can be used to manufacture the passive shut-off device 22.

The predetermined transition temperature $T_D$ is calculated as a function of the maximum temperature prevailing in the inner annular peripheral chamber 16. The transition between position P1 and position P2 can take place rapidly or gradually as a function of the requirement relating to the discharge of the hot air. All of these parameters are linked to the properties of the shape memory material (the percentage of titanium and nickel, for example) and are known to a person skilled in the art.

The predetermined transition temperature $T_D$ can be between 70° C. and 90° C., preferably of the order of 80° C.

As a result, in situations in which the de-icing of the leading edge 14 is not necessary, the temperature in the inner annular peripheral chamber 16 will be the ambient temperature inside the leading edge 14. In this situation, it is beneficial to shut off the exhaust devices 20 in order not to generate parasitic drag or noise. The passive shut-off device 22 will therefore occupy the shut-off position P1. In this configuration shown in FIG. 2, the device 22 shuts off the exhaust orifice 20a.

Conversely, when the aircraft encounters icy conditions that require the de-icing of the leading edge 14 of the lip 12, pressurized hot air taken from the engine is conveyed by any known, suitable means to the inner annular peripheral chamber 16, and injected into it. As a result, the temperature in the annular chamber 16 increases. This temperature increase acts on the passive shut-off device 22, causing it to change shape. The shut-off device 22 passes from its so-called rest shape to its so-called deformed shape. The shape of the device 22 is thus modified; it moves away from the exhaust device 20 and clears it, allowing the discharge of the pressurized hot air present in the annular chamber 16 (arrow F). The passive shut-off device 22 then occupies the open position P2 shown in FIG. 3. In this configuration shown in FIG. 3, the device 22 clears the exhaust orifice 20a.

The passive shut-off device 22 takes the shape of a part that complements the shape of the exhaust device 20 so that it shuts it off when the device 22 is in the shut-off position P1.

According to one particular embodiment, the passive shut-off device 22 takes the form of a strip 22a the dimensions of which are suitable for shutting off the exhaust devices 20 when the device 22 is in the shut-off position P1. The shape of the strip 22a complements the shape of the exhaust devices 20. In the shut-off position P1, the strip 22a is positioned on the exhaust devices 20 so that it shuts them off.

Figure 4:
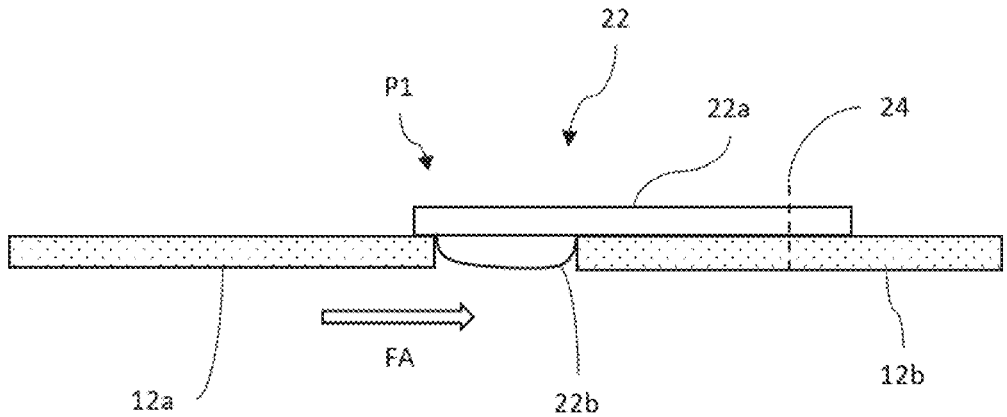
FIG. 4 shows an enlarged view of a passive shut-off device according to one variant of the invention.

According to another embodiment of the invention shown in FIG. 4, the passive shut-off device 22 comprises a protrusion 22b suitable for shutting off said exhaust devices 20. The protrusion 22b is sized so that it fits the geometry of each exhaust device 20. The dimensions of the protrusion 22b are also calculated so that it does not extend beyond the wall of the lip 12, with the aim of not disturbing the flow of the aerodynamic stream encountered by the lip 12 (arrow FA). The passive shut-off device 22 thus effectively shuts off the exhaust device 20 and prevents any leaking of air when the shut-off device 22 is in the shut-off position P1.

The protrusion 22b can be made from a deformable material so that it follows the shape of the exhaust devices 20 as closely as possible. Nitinol®, for example, can be used to manufacture the protrusion 22b.

When the ambient temperature of the inner annular peripheral chamber 16 is less than the predetermined transition temperature $T_D$, the leading edge 14 of the lip 12 does not require de-icing. No discharge of pressurized hot air is then required. As a result, the passive shut-off device 22 is not deformed, and it retains its original shape and occupies the shut-off position P1: it therefore shuts off the exhaust devices 20.

The behavior of the passive shut-off device 22 will now be described in detail, with reference to FIG. 5. When the aircraft encounters conditions that require the de-icing of the leading edge 14 of the lip 12, pressurized hot air is taken from the engine, conveyed by any known, suitable means to the inner annular peripheral chamber 16, and injected into it. The temperature in the chamber 16 increases gradually in order to de-ice the leading edge 14. As a result, the passive shut-off device 22 is subject to the increase in ambient temperature and starts to deform. When the ambient temperature becomes greater than the predetermined transition temperature $T_D + \Delta°$ C., the passive shut-off device 22 deforms and takes on its so-called deformed shape. It therefore occupies the open position P2. As long as the ambient temperature of the chamber 16 remains greater than the predetermined transition temperature $T_D + \Delta°$ C., the device 22 maintains its open position P2. If the operating conditions of the aircraft no longer require de-icing, pressurized hot air is no longer taken from the engine, and the ambient temperature in the annular chamber 16 decreases gradually until it falls back below the predetermined transition temperature $T_D$. The passive shut-off device 22 then returns to its original so-called rest shape. It then occupies the shut-off position P1.

The value $\Delta°$ C. can be between 0° C. and 30° C.

6

According to a first variant embodiment, the passive shut-off device 22 comprises a return spring 22c capable of returning said device to the shut-off position P1 (FIG. 7). The stiffness of the spring 22c is calculated so that said spring does not hinder the deformation of the strip 22a during its transition from the shut-off position P1 to the open position P2. Conversely, during the transition of the shut-off device 22 from the open position P2 to the shut-off position P1, the spring 22c exerts a return force promoting this transition and thus helping the shut-off device 22 to return to its shut-off position P1.

Figure 8:
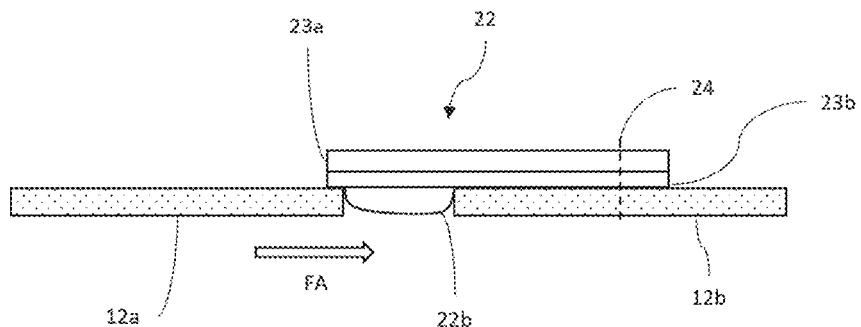
FIG. 8 shows a second variant embodiment of the passive shut-off device according to the invention.

According to a second variant embodiment shown in FIG. 8, the passive shut-off device 22 is made up of two strips 23a and 23b rigidly connected to each other and formed from a shape memory material having different transition temperatures. The advantage of such a configuration is to accelerate the shutting off of the exhaust devices 20, once the ambient temperature in the annular chamber 16 has fallen back below the predetermined transition temperature $T_D$.

The predetermined transition temperature $T_{Da}$ of the strip 23a is less than the predetermined transition temperature $T_{Db}$ of the strip 23b. For example, for a transition temperature $T_{Db}$ of the order of 80° C. of the strip 23b, the transition temperature $T_{Da}$ of the strip 23a will be of the order of 70° C. When the ambient temperature in the annular chamber 16 increases until it reaches $T_{Da}$, the strip 23a thus starts to deform before the strip 23b, causing however the deformation of the strip 23b. When the temperature in the annular chamber 16 reaches $T_{Db}$, the strip 23b starts to deform in turn, accelerating the deformation of the shut-off device 22 and therefore the transition from the shut-off position P1 to the open position P2. As explained above, the device 22 remains in the open position P2 as long as the ambient temperature in the inner annular peripheral chamber 16 is greater than $T_{Db} + \Delta°$ C.

Conversely, when the temperature in the annular chamber 16 decreases and drops back below $T_{Db}$, the strip 23b deforms again to return to its initial so-called rest shape, as does the strip 23a when the temperature becomes less than $T_{Da}$, thus helping the shut-off device 22 to return to its shut-off position P1.

In this configuration, the strip 23b is fastened to the air intake 12 when the passive shut-off device 22 is in its shut-off position P1 and the strip 23a is positioned above the strip 23b.

According to another configuration, it is the strip 23a that is fastened to the air intake 12 when the passive shut-off device 22 is in its shut-off position P1, the strip 23b being positioned above the strip 23a.

In the embodiment in which the exhaust device takes the form of an exhaust orifice 20a, the passive shut-off device 22 can comprise a protrusion 22b arranged facing said orifice 20a. This exemplary embodiment is shown in FIG. 4. The protrusion 22b can be added to the shut-off device 22 at the same time as the device 22 is being manufactured, or it can be added subsequently and fastened to said device 22 by any fastening means known to a person skilled in the art.

In one variant embodiment schematically shown in FIG. 6, the leading edge 14 of the air intake 12 comprises at least one exhaust device 20 in the form of an exhaust grille 20b comprising a plurality of exhaust orifices 20c to discharge the hot air from the annular chamber 16. In this case, the passive shut-off device 22 (shown on the side for the sake of clarity) comprises as many strips 22a as the exhaust grille 20b comprises exhaust orifices 20c.

These strips 22a can comprise protrusions 22b (shown in dashed lines) in order to shut off the exhaust orifices 20c more effectively. In this variant embodiment, the strips 22*a* comprise as many protrusions 22*b* as there are exhaust orifices 20*c*.

Each strip 22*a* of the passive shut-off device 22 is fastened to the leading edge 14 via fastening means 24.

In one variant embodiment, the passive shut-off device 22 comprises a single plate the dimensions of which are suitable for covering all of the exhaust orifices 20*c* of the exhaust grille 20*b*.

The single plate can comprise protrusions 22*b* arranged facing each exhaust orifice 20*c* of the exhaust grille 20*b*. As in the variant embodiment above, the plate comprises as many protrusions 22*b* as there are exhaust orifices 20*c*.

Regardless of the embodiment, each passive shut-off device 22 is capable of covering the exhaust device 20 facing which it is fastened.

There are numerous advantages of such a passive shut-off device 22.

This shut-off device 22 is passive, and does not require any specific energy source or active system such as a cylinder or controller, It is easy to use, assemble and dismantle, It permits the discharge of the pressurized hot air circulating in the annular peripheral chamber when the conditions so require, This device 22 greatly minimizes the parasitic drag and noise generated by the devices of the prior art.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An air intake lip of an aircraft engine nacelle comprising:

a hollow leading edge defining an inner annular peripheral chamber closed by an inner partition in which pressurized hot air circulates, said hollow leading edge comprising at least one hot air exhaust device to allow a discharge of all or part of said hot air circulating in said annular peripheral chamber to an outside of the said annular peripheral chamber and said hollow leading edge further comprising at least one passive shut-off device for said at least one hot air exhaust device, said at least one passive shut-off device configured to move between a shut-off position in which said at least one passive shut-off device shuts off said at least one hot air exhaust device and an open position in which said at least one passive shut-off device clears said at least one hot air exhaust device, said at least one passive shut-off device being made from a shape memory material.

2. The air intake lip of the aircraft engine nacelle according to claim 1, wherein a shape of said at least one passive shut-off device is complementary to a shape of the at least one hot air exhaust device.

3. The air intake lip of the aircraft engine nacelle according to claim 1, wherein said at least one passive shut-off device is configured to deform from a predetermined transition temperature ($T_D$).

4. The air intake lip of the aircraft engine nacelle according to claim 3, wherein said at least one passive shut-off device is configured to occupy the shut-off position as soon as a temperature in the inner annular peripheral chamber is less than the predetermined transition temperature ($T_D$).

5. The air intake lip of the aircraft engine nacelle according to claim 3, wherein said at least one passive shut-off device is configured to occupy the open position as long as a temperature in the inner annular peripheral chamber is greater than the predetermined transition temperature ($T_D$)+ $\Delta°$ C.

6. The air intake lip of the aircraft engine nacelle according to claim 1, wherein said at least one exhaust device comprises an exhaust orifice configured to discharge pressurized hot air from the inner annular peripheral chamber.

7. The air intake lip of the aircraft engine nacelle according to claim 6, wherein said at least one passive shut-off device comprises a strip arranged facing said exhaust orifice.

8. The air intake lip of the aircraft engine nacelle according to claim 7, wherein a number of strips and a number of exhaust orifices is equal.

9. The air intake lip of the aircraft engine nacelle according to claim 1, wherein said at least one exhaust device comprises an exhaust grille comprising a plurality of exhaust orifices configured to discharge pressurized hot air from the inner annular peripheral chamber.

10. The air intake lip of the aircraft engine nacelle according to claim 9, wherein said at least one passive shut-off device comprises a single plate having dimensions suitable for covering all of the exhaust orifices of the exhaust grille.

11. The air intake lip of the aircraft engine nacelle according to claim 1, wherein said at least one passive shut-off device comprises at least one protrusion suitable for shutting off said at least one exhaust device.

12. An aircraft comprising:

the air intake lip according to claim 1.

* * * * *